United States Patent
Zerouk

(10) Patent No.: US 7,382,682 B2
(45) Date of Patent: Jun. 3, 2008

(54) PROCESSING SEISMIC DATA

(75) Inventor: Kamil Zerouk, Hove (GB)

(73) Assignee: Western Geco L.L.C., Houston, TX (US)

( * ) Notice: Subject to any disclaimer, the term of this patent is extended or adjusted under 35 U.S.C. 154(b) by 294 days.

(21) Appl. No.: 10/537,560

(22) PCT Filed: Dec. 3, 2003

(86) PCT No.: PCT/GB03/05278

§ 371 (c)(1),
(2), (4) Date: Jun. 3, 2005

(87) PCT Pub. No.: WO2004/051315

PCT Pub. Date: Jun. 17, 2004

(65) Prior Publication Data

US 2006/0050612 A1    Mar. 9, 2006

(30) Foreign Application Priority Data

Dec. 4, 2002   (GB) ................................ 0228260.6

(51) Int. Cl.
G01V 1/36    (2006.01)
(52) U.S. Cl. ............................ 367/21; 367/43; 367/46; 702/17
(58) Field of Classification Search ................ 367/20, 367/21, 43, 46, 901; 702/17
See application file for complete search history.

(56) References Cited

U.S. PATENT DOCUMENTS 4,310,904 A    1/1982 Ballard et al.

(Continued)

FOREIGN PATENT DOCUMENTS

GB    2 337 591    11/1999

(Continued)

OTHER PUBLICATIONS

Anderson and McMechan, "Automatic editing of noisy seismic data," *Geophysical Prospecting*, 37(8):875, 1989.

(Continued)

*Primary Examiner*—Ian J Lobo
(74) *Attorney, Agent, or Firm*—Ari Pramudji; Liangang (Mark) Ye; Jeffrey E. Griffin

(57) ABSTRACT

The invention relates to processing seismic data that contains both a desired signal and swell noise. The method is applicable to seismic data is in the frequency-space domain method and comprises determining a signal-only prediction filter from the seismic data at a first frequency at which swell noise is not present, and applying the prediction filter to seismic data at a second frequency at which swell noise is present. This attenuates swell noise in the seismic data at the second frequency.

In one embodiment, the prediction filter for a frequency $f_L$, the lowest frequency at which swell noise is present, is determined from seismic data at frequency $f_{H+1}$, where $f_H$ is the highest frequency at which swell noise is present. The prediction filter for a frequency $f_{L+1}$ is determined from seismic data at frequency $f_{H+2}$, and so on, so that the prediction filter for frequency $f_{H+1}$ is determined from seismic data at frequency $f_{2H-L+1}$. In this way, the prediction filter for each frequency in the swell noise range is determined from seismic data outside the swell noise range, but at a frequency close to the swell noise range, and this provides effective extraction of the signal and attenuation of the swell noise. Furthermore, no prediction filters is applied to data of more than one frequency, so that an error in the determination of a particular prediction filter will have only limited effect on the processed data.

17 Claims, 5 Drawing Sheets

U.S. PATENT DOCUMENTS

| | | | | |
|---|---|---|---|---|
| 4,397,006 A | * | 8/1983 | Galbraith, Jr. | 702/17 |
| 4,992,995 A | * | 2/1991 | Favret | 367/46 |
| 5,067,112 A | * | 11/1991 | Meek et al. | 367/43 |
| 5,191,526 A | | 3/1993 | Laster et al. | |
| 5,771,203 A | | 6/1998 | Soubaras | |
| 6,446,008 B1 | | 9/2002 | Ozbek | |
| 6,651,007 B2 | * | 11/2003 | Ozbek | 702/17 |

FOREIGN PATENT DOCUMENTS

| | | |
|---|---|---|
| WO | WO 99/60421 | 11/1999 |

OTHER PUBLICATIONS

Cambois and Frelet, "Can we surgically remove swell noise?" *SEG Geophysicists*, pp. 1381-1384, 1995.

Canales, "Random noise reduction," *SEG Technical Program Expanded Abstracts*, pp. 525-527, 1984.

Holcombe and Wojslaw, "Spatially weighted trim stacking: A technique for prestack noise," *SEG Geophysicists*, pp. 1157-1160, 1992.

Spitz, "Adaptive dip filtering in the *F-X* domain," SEG 63$^{rd}$ Ann. Intern. Mtg., pp. 1181-1182, 1993.

UK Search Report dated Apr. 9, 2003 for Application No. GB 0228260.6.

Watts et al., "Attenuation of marine wave swell noise by stacking in the wavelet packet domain," *SEG Expanded Abstracts*, XX(XX):1-4, 1999.

* cited by examiner

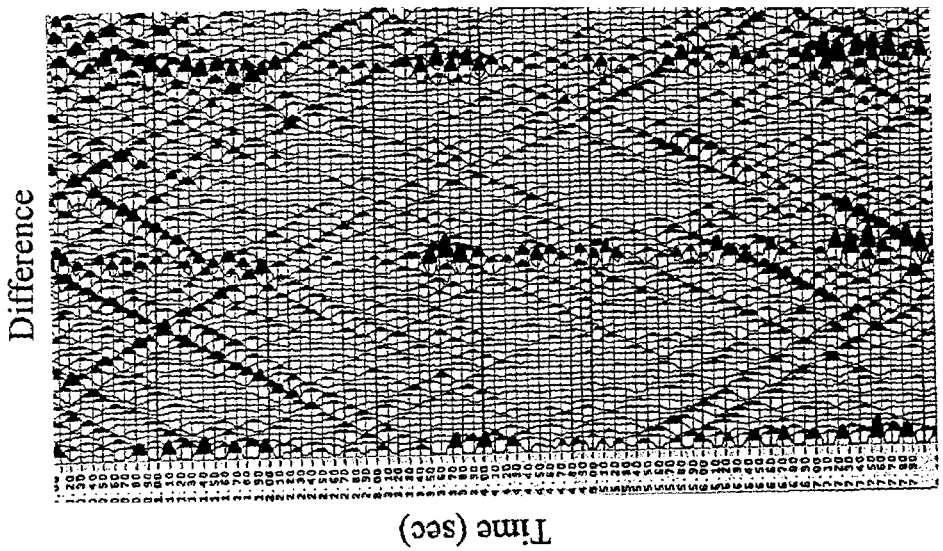
FIG 4(c) Difference
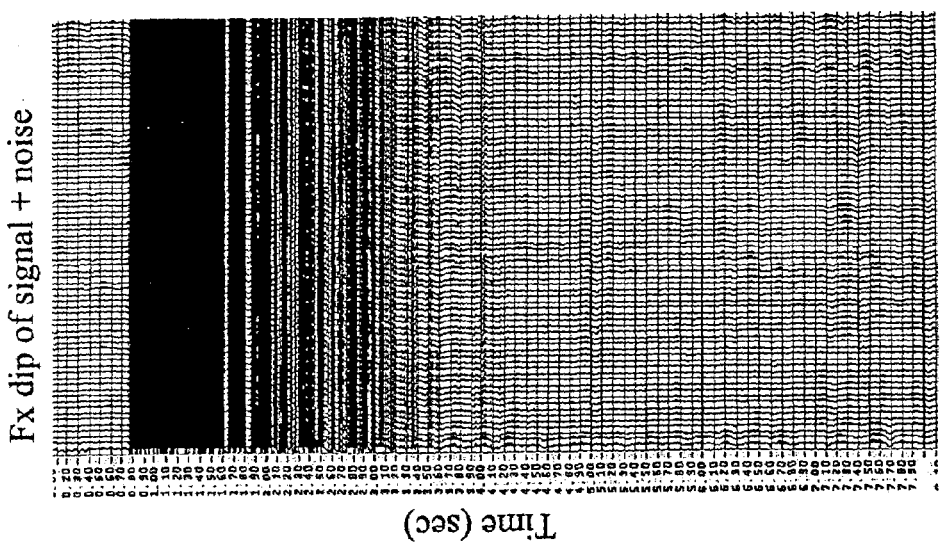
FIG 4(b) Fx dip of signal + noise
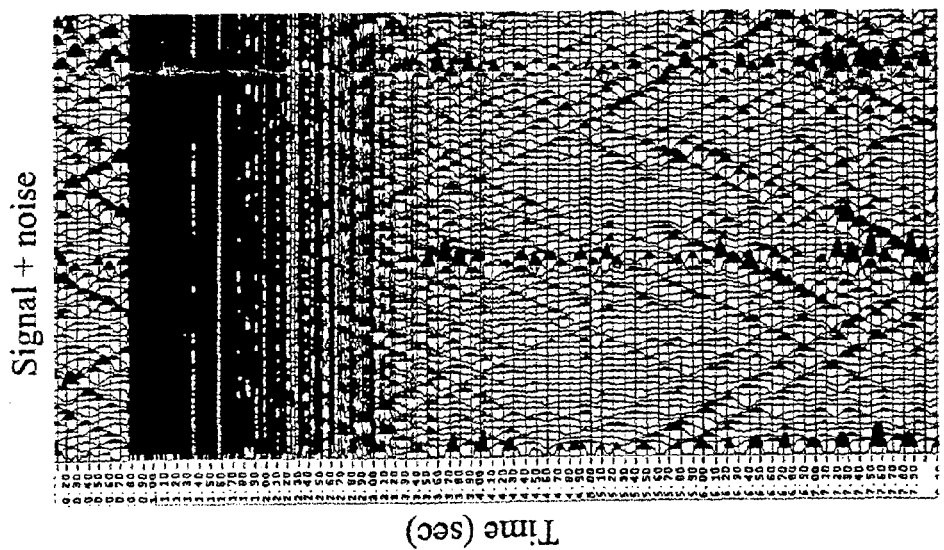
FIG 4(a) Signal + noise

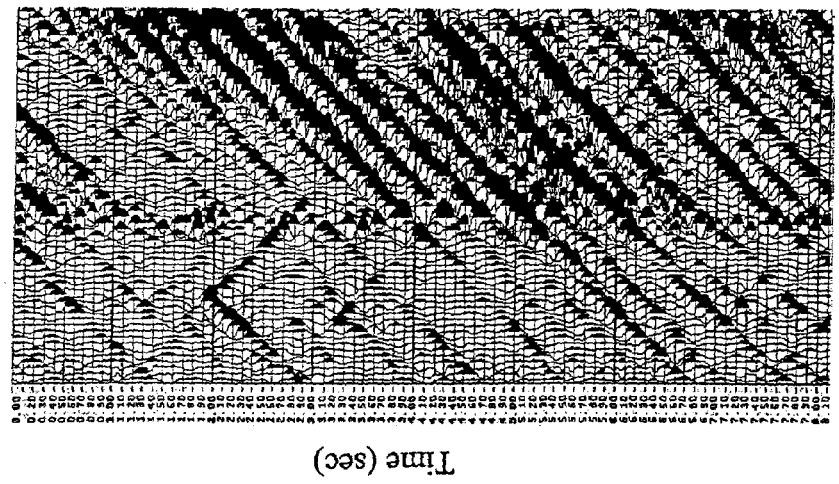
FIG. 5(c) Difference
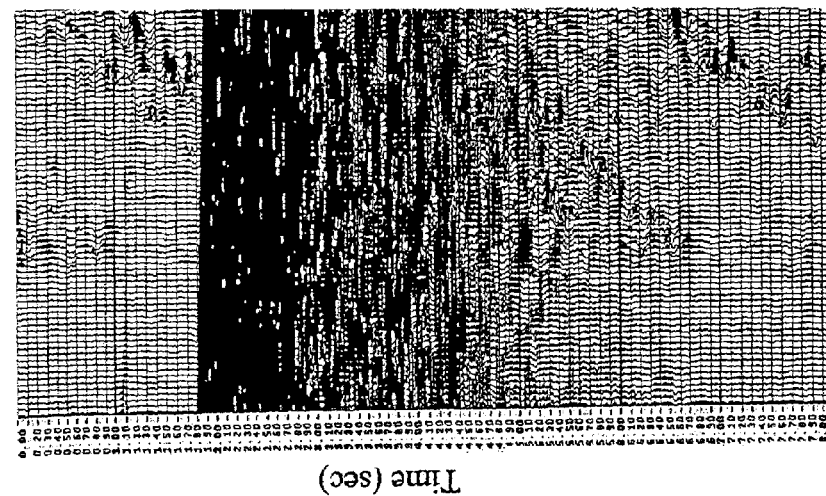
FIG. 5(b) Fx dip
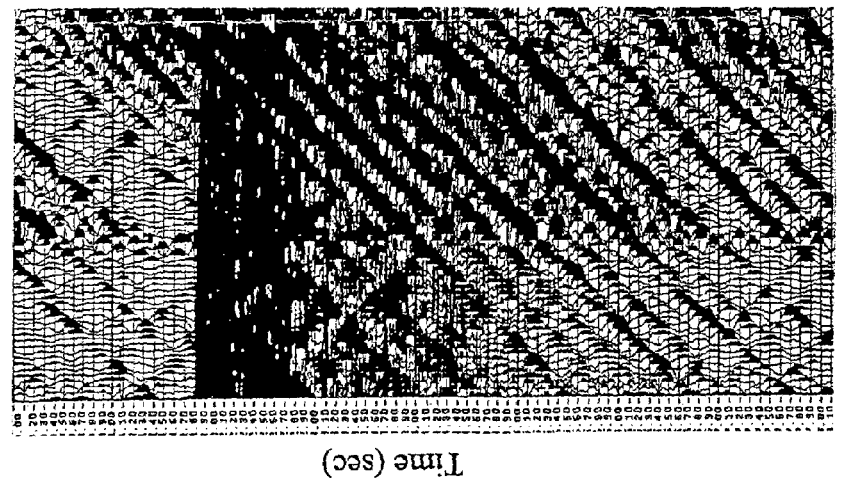
FIG. 5(a) Single sensor

PROCESSING SEISMIC DATA

The present invention relates to processing seismic data and, in particular, to processing marine seismic data that includes swell noise so as to attenuate or remove the swell noise.

In a seismic survey, acoustic energy is emitted from a source and is detected by a sensor (generally referred to as a "receiver") located at a distance from the source. Some of the acoustic energy emitted by the source passes into the earth's interior and is reflected by geological structures within the earth. Information about the geological structure of the earth's interior can be derived from the reflected acoustic energy incident on the receiver.

In a marine seismic survey both the acoustic source and receiver are disposed within a water column, such as the sea. FIG. 1 is a schematic illustration of one marine seismic survey in which an acoustic energy source 1, such as an airgun, is suspended in the water column 2 from a survey vessel 3. An array of receivers 5 such as, for example, hydrophones, is also disposed in the water column 2, and the receivers 5 are suspended from a float 6 that is towed by a second survey vessel 4. Such a receiver array is known generally as a "towed marine" receiver array.

When the acoustic source 1 is actuated it emits acoustic energy. Acoustic energy emitted by the source propagates generally downwards through the water column, passes into the earth's interior 7 and continues to propagate generally downwards through the earth's interior until it undergoes partial reflection at a geological structure within the earth's interior. Reflected acoustic energy propagates generally upwards through the earth's interior 7 and through the water column 2 and is incident on the array of receivers 5. Seismic data acquired by the receivers 5 following actuation of the acoustic source 1 are transmitted to the second survey vessel 4, for example by an electrical or optical link. The data may be analysed in a processor 8 located on the second survey vessel or may be stored for subsequent analysis. The principle of seismic surveying is to obtain information about the earth's interior by suitable processing of the seismic data acquired at the receivers 5.

In general, more than one geological structure within the earth's interior acts as a partial reflector for acoustic energy. The seismic data acquired at a receiver 5 following actuation of the acoustic source 1 therefore contain a number of spatially coherent events, each of which corresponds to reflection of acoustic energy at an associated geological feature within the earth that acts as a partial reflector of acoustic energy.

One problem in processing towed marine seismic data is that data acquired in rough sea conditions may contain swell noise. Swell noise may be either coherent or random, and occurs at low frequencies, generally below 30 Hz. Swell noise generated by a rough sea interferes destructively with the desired events in the seismic data (i.e., the events arising from reflection of seismic energy by geological features within the earth). Swell noise must be removed from the seismic data at some stage during the processing of the data, and the removal of swell noise is one of the most important steps leading to final interpretation of the acquired data and subsequent mapping of the earth's interior.

A number of prior art methods for attenuation of swell noise are known.

G. A. McMechan has proposed, in "Automatic editing of noisy seismic data", Geophysical Prospecting, Vol. pp 875-892 (1989), a method in which the low frequency energy content of a seismic trace is evaluated. A trace is discarded if its low frequency energy content exceeds a given threshold. This method has the severe disadvantage that the desired signal in the trace is also lost in the process.

H. Truman Holcombe and Robert S. Wojslaw have proposed, in "Spatially weighted trim stacking, a technique for prestack suppression", Society of Exploration Geophysicists, pp 1157-1160 (1992), a method that involves locating swell noise in a trace and replacing the affected portion of the trace with an interpolation which makes use of the neighbouring traces. Since this method requires an interpolation using neighbouring traces reflector dip information is therefore required, so that this method is a costly and often inaccurate process. Furthermore the dip search can only provide the dominant dip.

Guillaume Cambois and Jacques Frelet have proposed, in "Can we surgically remove swell noise ?", Society of Exploration Geophysicists, 1995, a noise free prediction filter that is designed and applied in the f-x (frequency-space) domain. This filter is quite efficient at filtering out swell noise when it is random, but coherent swell noise is not eliminated by this method but rather is enhanced. This "one step ahead" prediction filter is a coherent enhancement process and hence cannot separate coherent swell noise from a coherent signal Ali Ozbek has proposed, in a patent application entitled "Adaptive Seismic Noise and Interference Attenuation Method" an adaptive beamforming approach for attenuating the various types of coherent noise encountered in seismic data acquisition. This method applies an adaptive (t-x) time space filter in those parts of the frequency-wavenumber space that contain the noise. Seismic signals are passed while coherent noise and interference components that are temporally and spatially not stationary are adaptively filtered. This method can be quite effective but can be computationally intensive.

L. Canales has also proposed a method of attenuating swell noise, in the SGE 54$^{th}$ Annual International Meeting (1984). This is a "one step ahead" wiener prediction filtering process carried out in the f-x (frequency space) domain. Coherent signal and coherent swell noise are both enhanced.

S. Spitz has proposed, in "Adaptive Dip Filtering in the F-X Domain", SEG 63$^{rd}$ Annual International Meeting (1993) a method in which the prediction filters corresponding to all the dips within the data are evaluated through polynomial factorisation of the full prediction filter. All the dipping events, coherent noise include, within the input data are then solved for using a least square approach. This is a difficult task as all the dips need to be accounted for.

Proprietary modules that provide similar functions are known, and these generally involve comparing a time window within a given trace with surrounding traces to check for the presence of noise, usually against a user-specified threshold value. Noise above the specified threshold is removed. Such methods are, however, very sensitive to the threshold, and are likely either to remove too much from the data including some of the signal of interest or to leave some residual noise.

The present invention provides a method of processing seismic data, the data being in the frequency-space domain, the method comprising the steps of; determining a prediction filter from the seismic data at a first frequency at which swell noise is not present; and applying the prediction filter to seismic data at a second frequency at which swell noise is present, thereby to attenuate swell noise in the seismic data at the second frequency.

The prediction filter separates the swell noise from the signal of interest in the data, and attenuates the swell noise while fully preserving the signal of interest. The invention provides effective attenuation of both coherent and random swell noise without affecting the signal of interest.

A second aspect of the invention provides a method of marine seismic surveying comprising actuating a source to emit acoustic energy; acquiring seismic data in the frequency domain; and processing the data according to a method as defined above.

A third aspect of the invention provides an apparatus for processing seismic data, the data being in the frequency-space domain, the apparatus comprising means for determining a prediction filter from the seismic data at a first frequency at which swell noise is not present; and means for applying the prediction filter to seismic data at a second frequency at which swell noise is present, thereby to attenuate swell noise in the seismic data at the second frequency.

The apparatus may contain a programmable data processor.

A fourth aspect of the invention seismic surveying arrangement comprising: a source of acoustic energy, means for acquiring seismic data in the frequency-space domain; and an apparatus as defined above.

A fifth aspect of the invention provides a storage medium comprising a program for a data processor of an apparatus as defined in above, and a sixth aspect of the invention provides a storage medium containing a program for controlling a data processor to perform a method as defined above.

Preferred features of the invention are defined in the remaining claims.

A preferred embodiment of the invention will now be described in detail, by way of an illustrative example, with reference to the accompanying figures in which.

Figure 6:
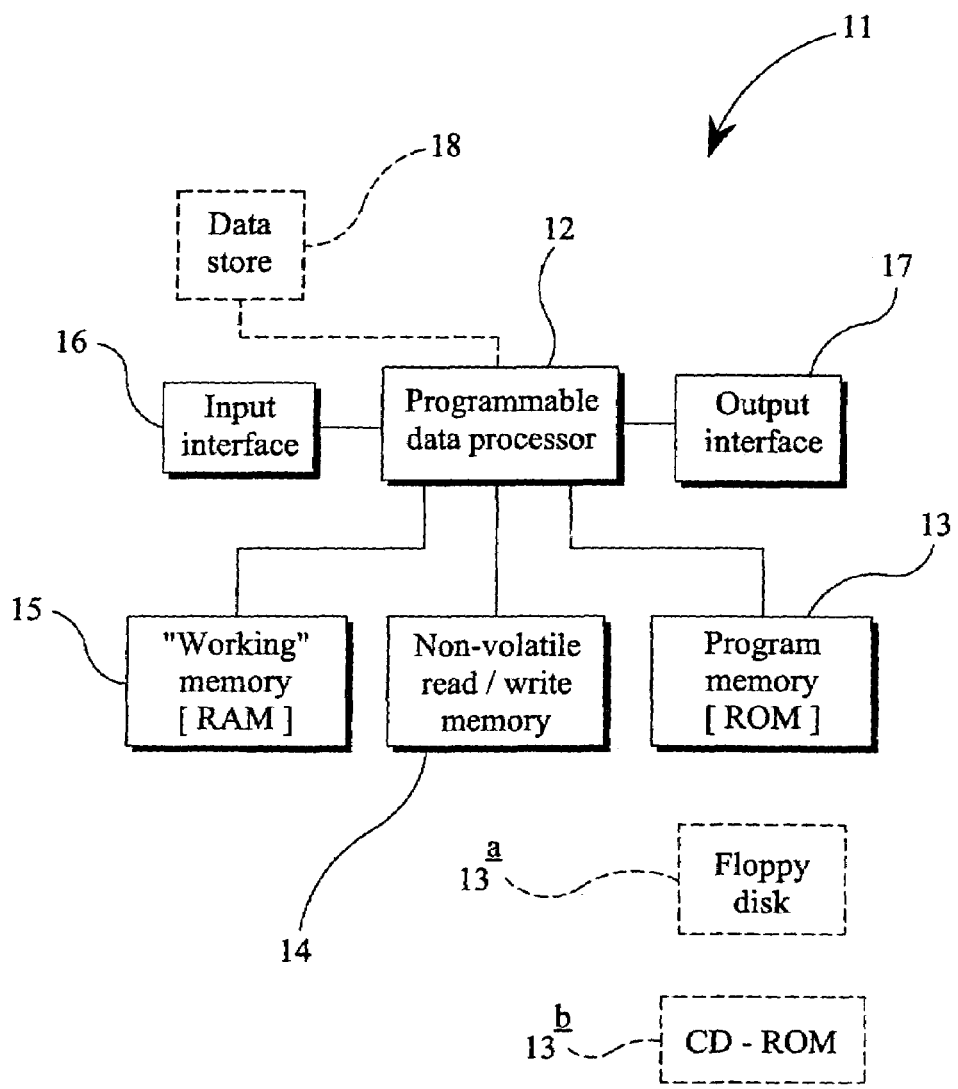

FIGS. 4(a) to 4(c) illustrates the results of the invention on synthetic seismic data;

FIGS. 5(a) to 5(c) illustrates the results of the invention as applied to single sensor seismic data;

FIG. 6 is a schematic block diagram of an apparatus according to the present invention.

Figure 1:
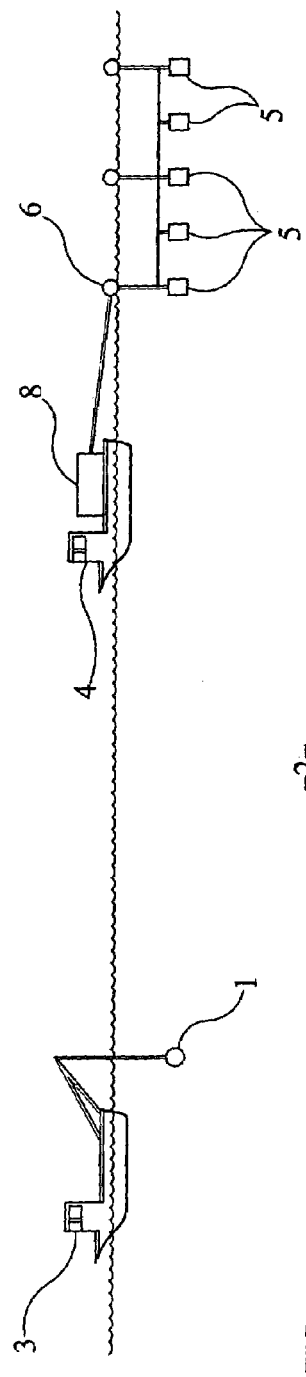
FIG. 1 is a schematic illustration of a towed marine seismic survey.

A seismic data trace acquired at one of the receivers 5 in the seismic surveying arrangement of FIG. 1 records the amplitude of a seismic parameter, such as the pressure or a component of particle motion, as a function of time. Examples of typical seismic data traces are shown in FIGS. 4(a) and 5(a) (these traces include swell noise) and in FIGS. 4(b) and 5(b) (which show the traces of FIGS. 4(a) and 5(a) after removal of swell noise). The acoustic source is actuated at time t=0, so that a trace measures the variation in amplitude of the parameter following the actuation of the acoustic source. It will be seen from FIGS. 4(b) and 5(b) that, when the acoustic source is actuated, there is initially, in the absence of noise, no signal acquired at the receiver. The first event in the seismic data trace generally arises from acoustic energy that has travelled direct from the source 1 to the receiver 5 through the water column, without entering the earth's interior. The time delay between the actuation of the acoustic source and this event (which is know as the "direct event") depends on the speed of propagation of acoustic energy through the water column and the distance between the acoustic source and the receiver. The direct event is then followed by events that arise from acoustic energy that has entered the earth's interior 7 and has undergone reflection at a geological feature within the earth.

The seismic data trace of FIGS. 4(a) to 5(c) are shown as continuous lines. In practice, however, a receiver will generally sample the seismic parameter with a sampling frequency $f_s$ (that is, the parameter is sampled at time intervals of $1/f_s$). The sampling interval $1/f_s$ may be, for example, 1, 2 or 4 ms. A data trace therefore consists of a series of discrete values for the parameter, one obtained in each sampling operation.

Figure 2:
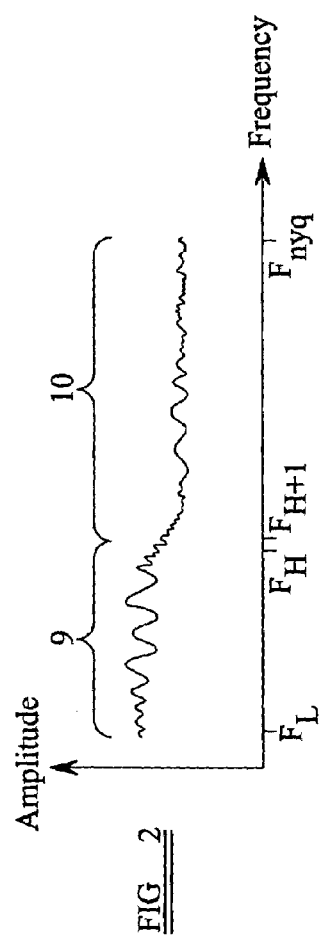
FIG. 2 illustrates a typical seismic data trace, in the frequency domain, obtained by the seismic survey of FIG. 1.

The seismic data trace in the time domain may be Fourier transformed to produce a record of the amplitude of the seismic parameter as a function of frequency. FIG. 2 is a schematic illustration of a typical data trace in the frequency domain, as would be obtained by transforming one of the data traces of FIG. 4(a) or 5(a) to the frequency-space domain by, for example, using a Fourier transform. Since the data trace in the time domain is obtained by a sampling process, with a sampling frequency $f_s$, the transformed data trace of FIG. 2 extends only to a maximum frequency of $f_{nyq}$, where $f_{nyq}$ is related to the sampling frequency $f_s$ by the Nyquist theorem. The data trace is shown as a continuous trace in FIG. 2 for convenience. As noted above, however, a seismic data trace in the time domain in practice consists of a series of discrete values rather than a continuous trace. The data trace in the frequency-space domain of FIG. 2 will therefore also consist of a series of values at discrete frequencies $f_j$, where the index j extends to the highest value J at which $f_j$ does not exceed the Nyquist frequency.

Swell noise is a low-frequency noise, typically having a maximum frequency of around 30 Hz. The frequency-space domain data trace of FIG. 2 therefore contains two regions—a low frequency region 9 that contains both the signal of interest and swell noise, and a higher frequency region 10 that contains only the signal of interest. In FIG. 2 the frequency region 9 that contains both swell noise and the signal of interest extends from frequency $f_L$ to frequency $f_H$, and that the frequency band that contains only the signal of interest is in the range from frequency $f_{H+1}$ to $f_{nyq}$.

The lower frequency limit, $f_L$, of the band containing swell noise will generally be zero. If $f_L$ is not zero, the data at frequencies below $f_L$ represents a combination of signal and noise other than swell noise.

In the method of the invention, a signal prediction filter is determined from the seismic data trace of FIG. 2 at a first frequency at which swell noise is not present—that is, at a frequency of $f_{H+1}$ or greater. The prediction filter is then applied to seismic data at a second frequency at which swell noise is present—that is, at a frequency between $f_L$ and $f_H$—so as to attenuate swell noise in the seismic data at the second frequency. The method is preferably repeated to obtain prediction filters for one or more other frequencies at which swell noise is present in the seismic data, for example by deriving a filter from data at a third frequency (at which swell noise is not present) and using this prediction filter to attenuate swell noise in the seismic data at a fourth frequency (at which swell noise is present). In a particularly preferred embodiment, an associated prediction filter is determined for each frequency in the swell noise range from $f_L$ to $f_H$, to enable swell noise to be attenuated from every frequency value in the swell noise range.

In the ideal case, the prediction filter that was to be applied at a frequency $f_j$ would be derived from seismic data for that frequency. In the present case, however, this ideal criterion would require that the prediction filter to be applied to seismic data at frequency in the range from $f_L$ to $f_H$ would be derived from the seismic data for that frequency—but this would mean deriving the prediction filter from seismic data that contains swell noise in addition to the signal of interest. According to the invention, therefore, the prediction filter for a frequency component $f_j$ is derived from the seismic data for a frequency that is close to $f_j$ but that is outside the frequency range within which swell noise occurs. This is a reasonable approximation, provided that the characteristics of the signal of interest are identical, or very similar, for the frequency $f_j$ and for the frequency at which the filter is derived.

In principle, a single prediction filter determined from data for a single frequency at which swell noise is not present could be applied at every frequency at which swell noise is present. This however has the potential disadvantage that if the filter is corrupted for any reason, then the output obtained by applying the filter will be noisy at every frequency in the swell noise range. It is therefore preferable that a plurality of prediction filters, each determined from data at a different frequency, are used so that the effect of one corrupted filter will be reduced. It is particularly preferable that each prediction filter is applied to data at only one frequency in the swell noise range. This means that the number of different prediction filters required is equal to the number of frequencies at which swell noise is to be attenuated—and, as noted above, each filter is preferably determined at a frequency close to the swell noise range.

In a particularly preferred embodiment of the invention, the filter to be applied to the data at frequency $f_L$ is derived from data at frequency $f_{H+1}$. The frequency $f_{H+1}$ is, as noted above, outside the range at which swell noise occurs, and is the lowest frequency outside the range at which swell noise occurs. The signal characteristics at frequency $f_{H+1}$ should be similar to those for frequency $f_L$.

In this embodiment, the filter to be applied at frequency $f_{L+1}$ is derived from the seismic data at $f_{H+2}$. Again, the frequency $f_{H+2}$ is outside the frequency band within which swell noise occurs, and the signal of interest at frequency $f_{H+2}$ should be similar to the signal of interest at $f_{L+1}$.

Furthermore, in this embodiment, for each frequency $f_i$ within the frequency band for which swell noise occurs, the associated prediction filter is determined from the seismic data at a frequency $f_{i-L+H+1}$. Thus, finally, the prediction filter for the highest frequency $f_H$ in the swell noise band is derived from the seismic data at frequency $f_{2H-L+1}$.

The frequency range in which the prediction filter is derived thus starts at $f_{H+1}$, and this frequency fulfils two important criteria. Firstly, data acquired at this frequency, or at a higher frequency, is assumed to be free of swell noise. Secondly, this frequency is as close as possible to frequency $f_L$, so that the signal of interest should be similar at frequencies $f_{H+1}$ and $f_L$. Furthermore, in this embodiment each filter is applied only to data at one frequency, so that the effect of a corrupted filter is minimised.

Figure 3:
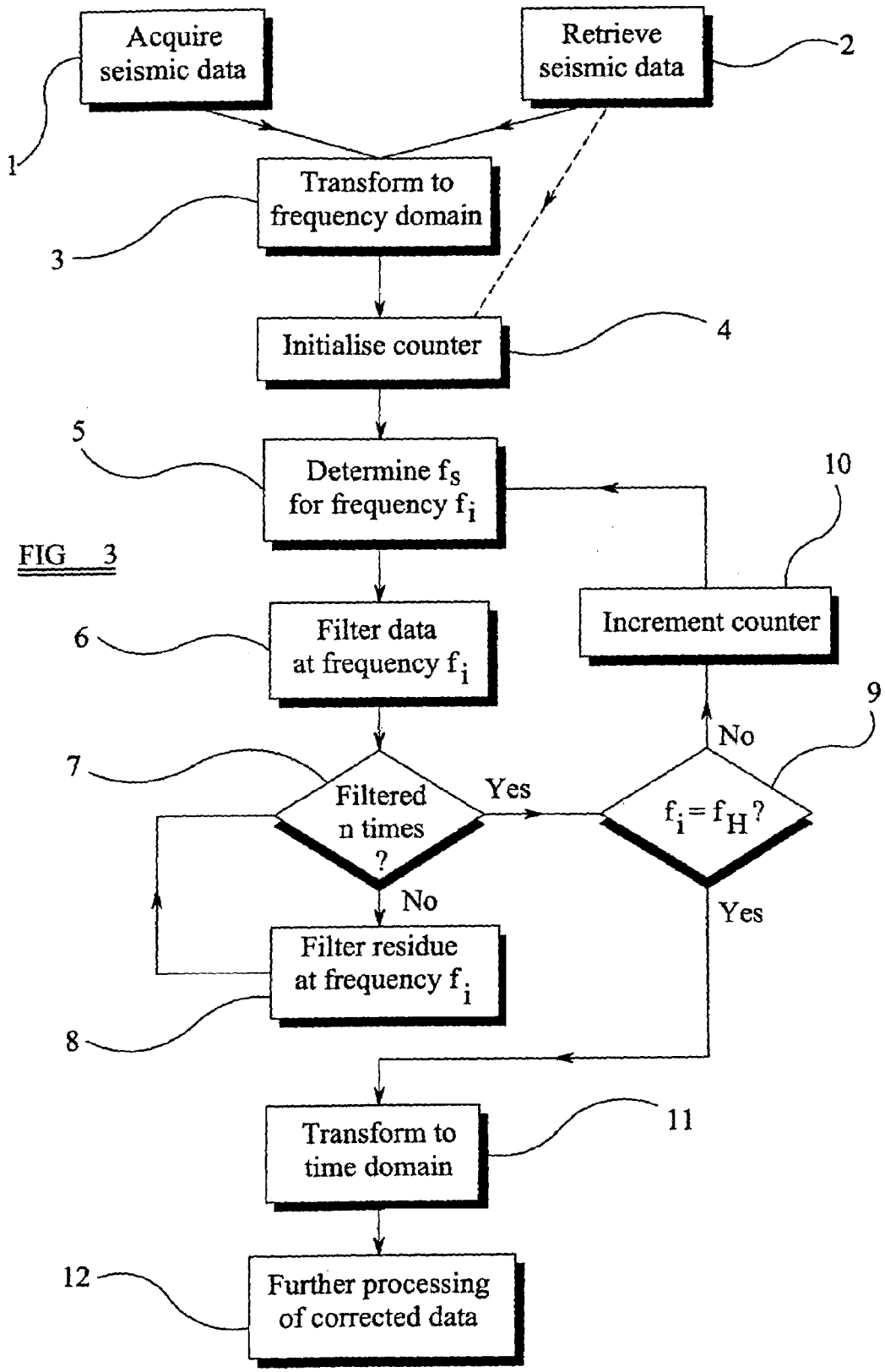
FIG. 3 is a flow diagram of a method according to one embodiment of the present invention.

FIG. 3 is a block flow diagram of one embodiment of the present invention.

Initially at step 1 seismic data are obtained, for example, using a towed marine seismic surveying arrangement of the type shown in FIG. 1. The seismic data will consist of a number of traces generally similar to those shown in FIG. 4(*a*) or 5(*a*).

The invention may alternatively be applied to pre-existing seismic data. In this case, step 1 is replaced by step 2 of retrieving pre-existing seismic data from storage.

At step 3, the seismic data are Fourier transformed to produce seismic data traces of the general type shown in FIG. 2 that contain information as to the frequency dependence of the amplitude of a seismic parameter.

It should be noted that, in an embodiment where stored seismic data are retrieved from storage in step 2, step 3 may be omitted if the retrieved seismic data are already in the frequency domain; this is indicated by a broken line.

At step 4, a frequency counter i is initialised, and at step 5 a filter $F_S$ is determined for an initial frequency component $f_i$ in the range where swell noise is present in the seismic data. Conveniently, step 5 is initially performed for the lowest frequency component at which swell noise is present, that is, for frequency $f_i=f_L$ (and in this case step 4 will have set the counter i equal to L). As mentioned above, in one preferred embodiment the prediction filter for frequency $f_L$ is determined from seismic data at frequency $f_{H+1}$.

At step 6, the data at frequency $f_i$ for all traces, are operated on by the filter $F_S$ determined for frequency $f_i$ in step 5, according to equation 1.

At step 7, it is determined whether the filter has been applied a pre-determined number (n) times. The pre-determined number n may be specified by the user for processing a particular data set. If step 7 yields a "no" determination, at step 8 the filter $F_s$ is re-applied to the results obtained in step 6. Step 7 is then repeated, and if a "yes" determination is still not obtained, steps 8 and 7 are repeated until a "yes" determination is obtained.

For example, a user could specify that the filter is to be applied three times (n=3), in which case step 8 would be carried out twice (so that the filter was applied once to the initial data and twice to the output of the previous iterations.) If desired, the method may comprise the step (not shown) of a user defining the number of times the filter should be applied.

In an alternative embodiment, step 7 is replaced by a quality control step (not shown), so that the filter is applied until a desired result is obtained, and is not applied a pre-determined number of times. For example, the residual obtained in one step may be compared with the previous residual.

At step 9, it is determined whether the counter indicates that the process has been carried out for all frequencies in the range where swell noise is present. If the value of the counter i is not equal to H so $f_i$ is not equal to $f_H$, step 9 yields a "no" determination, the frequency counter i is incremented at step 10, and steps 5-8 are then repeated for the next frequency—in this example, $f_{L+1}$. Assuming that a "no" determination is still obtained at step 9, the counter is again incremented at step 10, and steps 5-9 are repeated until a "yes" determination is obtained in step 9. A "yes" determination will be obtained when a method has been carried out in all frequencies in the range $f_L$ to $f_H$—that is, for all frequencies at which the data contains swell noise.

Alternatively, the method may comprises performing steps 5 to 8 initially for $f_H$, in which case step 10 comprises decrementing the counter. In this variation a "yes" determination is obtained at step 9 once the frequency has been reduced to $f_L$.

Once a "yes" determination is obtained at step 9, the results of the method may be output if desired (not shown). The results output may include, for each original data trace, a corrected version of the data trace from which swell noise has been removed. The corrected data trace may be obtained, for example, by subtracting the final residual obtained at the end of the iteration step process 7 and 8 from the original data trace. Additionally or alternatively, the results output may include the residual obtained from each data trace.

Additionally or alternatively the corrected data traces may be subjected to further processing steps, to obtain information about the geological structure of the earth's interior, and this is indicated at step 12. If necessary, the corrected data traces are transformed back to the time domain at step 11 before step 12 is applied. These further data processing steps are conventional, and will not be described here further.

FIGS. 4(*a*) to 4(*c*) and 5(*a*) to 5(*c*) illustrate results of the present invention. FIGS. 4(*a*) to 4(*c*) illustrate the invention as applied to synthetic seismic data, and FIGS. 5(*a*) to 5(*c*) illustrate the invention as applied to actual marine seismic data.

FIG. 4(*a*) shows synthetic marine seismic data obtained using a simulation method that generates swell noise. The data were simulated for a seismic surveying arrangement in which the direct arrival occurs approximately 0.8 seconds after the acoustic source has been actuated. FIG. 4(a) shows approximately 75 simulated data traces, in the time domain. Each trace shows the amplitude (horizontal axis) of the pressure as a function of the time (vertical axis) after the actuation of the acoustic source. It will be noted that the data traces contain significant variations in amplitude at times before the direct arrival.

FIG. 4(b) shows the traces of FIG. 4(a) after swell noise has been attenuated using a method of the invention, and FIG. 4(c) shows the residual which represents swell noise. (It should be noted that although the method of the invention is carried out in the frequency domain, the results for the corrected data traces and the swell noise have been transformed back to the time domain to enable easy comparison with the original data traces.)

If FIG. 4(b) is examined, it will be seen that there is very little structure in the seismic data traces before the direct arrival occurs at approximately 0.8 seconds after the actuation of the acoustic source. This indicates that the invention is effective in removing swell noise since, in the absence of noise, the receivers should not detect any acoustic energy from the source before the direct arrival. It will also be noted that there is significantly less structure in the seismic data traces for times greater than approximately 3 seconds after the actuation of the acoustic source. This indicates that most of the structure seen in the original data traces of FIG. 4(a) at 3 seconds or greater after the actuation of the acoustic source does not result from reflection by a geological structure but arises from swell noise.

It will further be noted that the events in the seismic data traces occurring at times from approximately 1.6 to 3 seconds after the actuation of the seismic source are much clearer in the corrected seismic data traces of FIG. 4(b) than in the original data traces of FIG. 4(a). This indicates that the attenuation of swell noise has been effective throughout the entire data trace. As a result, information about the structure of the earth's interior derived from analysis of these events should be more accurate than if the original uncorrected data traces of FIG. 4(a) had been used.

FIGS. 5(a) to 5(c) again show results of the present invention, but applied to actual seismic data. These seismic data were acquired using a marine seismic surveying arrangement in which the direct arrival occurs approximately 1.8 seconds after the actuation of the acoustic source. The figures show data for approximately 70 receivers, and these are arranged as a linear array extending generally away from the source. As a result, the arrival time of the direct event increases gradually from one trace to the next, as a consequence of the increasing distance between the source and the receiver used to acquire a particular trace.

As is clearly seen in FIG. 5(a), the acquired seismic data contain significant amplitude variations for times before the arrival of the direct event and, as explained above, these amplitude variations arise primarily from swell noise.

FIG. 5(b) shows the traces of FIG. 5(a) after attenuation of swell noise using a method of the present invention. It will be seen that the amplitude variations in the traces for times before the arrival of the direct event have been significantly reduced. It will also be seen that many of the events in the traces for long arrival times have also been eliminated, and this indicates that these events arise from swell noise rather from reflection by a geological feature within the earth. The events of interest in the data traces, which generally occur at times between 1.8 and approximately 5-6 seconds after the actuation of the source are much clearer in FIG. 5(b) than in the original traces of 5(a).

FIG. 5(c) again shows the residual, which represents swell noise. The results for the corrected data traces and the swell noise have again been transformed back to the time domain to enable easy comparison with the original data traces.

A preferred embodiment of the filtering method will now be described.

Let $D_i$ denote the input data. This is assumed to consist of N traces identified by the index i where $1 \leq i \leq N$. These traces are acquired at the same time but by different receivers in a receiver array. Each trace will contain a signal of interest, and will also contain swell noise. The signal of interest in the $i^{th}$ trace will be denoted by $X_{Si}$ and the swell noise value in the $i^{th}$ trace will be denoted by $X_{Ni}$. Thus:

$$D_1 = X_{S1} + X_{N1}$$

$$D_2 = X_{S2} + X_{N2}$$

$$D_3 = X_{S3} + X_{N3}$$

...
...
...

$$D_N = X_{SN} + X_{NN}$$

The signal prediction filter is denoted by $F_S = [F_{S1}\ F_{S2}\ F_{S3} \ldots F_{SL}]$, where $F_{Sk}$ denotes the $k^{th}$ filter component. $F_S$ is a general term for a prediction filter derived at a particular frequency outside the swell noise range. The index k satisfies $0 \leq k \leq P$, where P is the number of signal related dips. The filter length is preferably between 3 and 10 traces. The prediction filter may be derived by any suitable technique such as, for example, Wiener filtering. As noted above, in a preferred embodiment the prediction filter for frequency $f_L$ is determined from data at frequency $f_{H+1}$, the prediction filter for frequency $f_{L+1}$ is determined from data at frequency $f_{H+2}$, and so on.

An appropriate filter $F_S$ is applied to each seismic data trace at each frequency in the range $(f_L-f_H)$ for all traces. The resultant signal is predictable as a function of space (Canales 1984, above).

Filtering the input data with $F_S$ only will result in the following system of linear equations:

$$\begin{bmatrix} D_1 & 0 & 0 & | \\ D_2 & D_1 & 0 & | \\ D_3 & D_2 & D_1 & | \\ | & D_3 & D_2 & | \\ | & | & D_3 & | \\ | & | & | & | \\ D_N & | & | & | \\ 0 & D_N & | & | \\ 0 & 0 & D_N & | \end{bmatrix} \begin{bmatrix} F_{S1} \\ F_{S2} \\ F_{S3} \\ | \\ | \\ | \\ | \\ F_{SL} \end{bmatrix} = \begin{bmatrix} X_{S1} \\ X_{S2} \\ X_{S3} \\ | \\ | \\ | \\ | \\ X_{SN} \\ 0 \end{bmatrix} + \begin{bmatrix} X_{N1} & 0 & 0 & | \\ X_{N2} & X_{N1} & 0 & | \\ X_{N3} & X_{N2} & X_{N1} & | \\ | & X_{N3} & X_{N2} & | \\ | & | & X_{N3} & | \\ | & | & | & | \\ X_{NN} & | & | & | \\ 0 & X_{NN} & | & | \\ 0 & 0 & X_{NN} & | \end{bmatrix} \begin{bmatrix} F_{S1} \\ F_{S2} \\ F_{S3} \\ | \\ | \\ | \\ | \\ F_{SL} \end{bmatrix} \quad (1)$$

The right hand side of equation (1) contains two terms. The first term represents the predicted signal for each data trace. Equation (1) assumes that the filter $F_S$ is exactly correct, so that this term is the exact signal component $X_{Si}$ of each data trace $D_i$.

The second term on the right hand side of Equation (1) is the results of the convolution of the swell noise with the signal filter, and this is termed the "residual". If the filter $F_S$ is exactly correct, the residual will not contain any of the signal of interest.

In practice, the filter $F_S$ derived from the data traces $D_i$ is unlikely to be exact so that the residual of the right hand side of equation (1) after a single application of the filter will contain some components of the signal of interest. It is therefore preferred to adopt an iterative approach, so that the residual term can be attenuated through further iterations thereby reducing the signal component of the residual. This is done by re-applying the filter $F_S$ to the full right-hand side of equation (1), and adding the results to the corresponding results obtained by the first iteration. The summation of the results of the two iterations will enhance the quality of the signal (the terms in $X_S$) and attenuate the noise (the term in $X_N$) through destructive interference. Further iterations may be applied as necessary, until the noise has been attenuated to a satisfactory level.

Equation (1) is performed at each frequency in the swell noise range, using the appropriate $F_S$ (i.e. $F_S(f_L)$ for data at frequency $f_L$, $Fs(f_{L+1})$ for data at frequency $f_{L+1}$, etc).

If the lower frequency limit of the swell noise range, $F_L$, is greater than zero, data at frequencies below $F_L$ will not be filtered. In this case, the output will consist of:

a) for frequencies of $F_{H+1}$ or above—unchanged signal-only data (since there is no swell noise in this range in the initial data);

b) for frequencies in range from $F_L$ to $F_H$—signal-only data (obtained by removal of swell noise); and c) for frequencies below $F_L$—signal and other noise (not swell noise).

If the lower frequency limit of the swell noise range, $F_L$, is zero, the output will consist only of (a) and (b) above.

FIG. 6 is a schematic block diagram of an apparatus 11 that is able to perform a method according to the present invention. The apparatus 11 may be used in a marine seismic surveying arrangement in place of the conventional processor 8 of FIG. 1, or it may be used to process pre-existing data. (If the apparatus 11 is used in a conventional marine seismic surveying arrangement of the type generally shown in FIG. 1, the seismic surveying arrangement requires means for acquiring seismic data in the frequency-space domain and these are conveniently provided by receivers for acquiring seismic data in the time domain and transform means for transforming the data to the frequency-space domain. The transform means may be incorporated in the apparatus 11 or they may be additional to it.)

The apparatus 11 comprises a programmable data processor 12 with a program memory 13, for instance in the form of a read only memory (ROM), storing a program for controlling the data processor 12 to process seismic data by a method of the invention. The apparatus further comprises non-volatile read/write memory 14 for storing, for example, any data which must be retained in the absence of a power supply. A "working" or "scratch pad" memory for the data processor is provided by a random access memory RAM 15. An input device 16 is provided, for instance for receiving user commands and data. One or more output devices 17 are provided, for instance, for displaying information relating to the progress and result of the processing. The output device(s) may be, for example, a printer, a visual display unit, or an output memory.

Sets of seismic data for processing may be supplied via the input device 16 or may optionally be provided by a machine-readable data store 18.

The results of the processing may be output via the output device 17 or may be stored.

The program for operating the system and for performing the method described hereinbefore is stored in the program memory 13, which may be embodied as a semiconductor memory, for instance of the well known ROM type. However, the program may well be stored in any other suitable storage medium, such as a magnetic data carrier 13a (such as a "floppy disk") or a CD-ROM 13b.

The invention claimed is:

1. A method of processing seismic data, the data being in the frequency-space domain, the method comprising:

determining a prediction filter from the seismic data at a first frequency at which swell noise is not present; and applying the prediction filter to seismic data at a second frequency at which swell noise is present, thereby to attenuate swell noise in the seismic data at the second frequency, wherein the second frequency is different from the first frequency.

2. The method as claimed in claim 1 and further comprising the steps of:

determining a prediction filter from the seismic data at a third frequency at which swell noise is not present, the third frequency not being equal to the first frequency; and applying the prediction filter to seismic data at a fourth frequency at which swell noise is present, the fourth frequency not being equal to the second frequency, thereby to attenuate swell noise in the seismic data at the fourth frequency.

3. The method as claimed in claim 2 wherein the difference between the first frequency and the second frequency is equal to the difference between the third frequency and the fourth frequency.

4. The method as claimed in claim 1 further comprising, for each frequency in the range for which swell noise is present in the seismic data, determining an associated prediction filter from the seismic data at a frequency at which swell noise is not present.

5. The method as claimed in claim 4 wherein the frequency range for which swell noise is present in the seismic data extends from a frequency $f_L$ to a frequency $f_H$, and the associated prediction filter for frequency $f_i$ is determined from seismic data at a frequency $f_{i-L+H+1}$.

6. The method of claim 1, wherein the first frequency is greater than the second frequency.

7. A method of marine seismic surveying comprising:

actuating a source to emit acoustic energy;

acquiring seismic data in the frequency-space domain;

determining a prediction filter from the seismic data at a first frequency at which swell noise is not present; and applying the prediction filter to seismic data at a second frequency at which swell noise is present, thereby to attenuate swell noise in the seismic data at the second frequency, wherein the second frequency is different from the first frequency.

8. The method as claimed in claim 7 wherein the step of acquiring seismic data in the frequency-space domain comprises acquiring seismic data in the time domain and transforming the data to the frequency-space domain.

9. The method as claimed in claim 8 comprising the further step of transforming the processed data to the time domain.

10. An apparatus for processing seismic data, the data being in the frequency-space domain, the apparatus comprising:

means for determining a prediction filter from the seismic data at a first frequency at which swell noise is not present; and means for applying the prediction filter to seismic data at a second frequency at which swell noise is present, thereby to attenuate swell noise in the seismic data at the second frequency, wherein the second frequency is different from the first frequency.

11. The apparatus as claimed in claim 10 and further comprising:

means for determining a prediction filter from the seismic data at a third frequency at which swell noise is not present, the third frequency not being equal to the first frequency; and means for applying the prediction filter to seismic data at a fourth frequency at which swell noise is present, the fourth frequency not being equal to the second frequency, thereby to attenuate swell noise in the seismic data at the fourth frequency.

12. The apparatus as claimed in claim 10 adapted to determine, for each frequency in the range for which swell noise is present in the seismic data, an associated prediction filter from the seismic data at a frequency at which swell noise is not present.

13. The apparatus as claimed in claim 12 wherein the frequency range for which swell noise is present in the seismic data extends from a frequency $f_L$ to a frequency $f_H$, and the apparatus determines, in use, an associated prediction filter for frequency $f_i$ from seismic data at a frequency $f_{i-L+H+1}$.

14. The apparatus as claimed in claim 10 comprising a programmable data processor.

15. A seismic surveying arrangement comprising:
   a source of acoustic energy;
   means for acquiring seismic data in the frequency-space domain;
   means for determining a prediction filter from the seismic data at a first frequency at which swell noise is not present; and
   means for applying the prediction filter to seismic data at a second frequency at which swell noise is present, thereby to attenuate swell noise in the seismic data at the second frequency, wherein the second frequency is different from the first frequency.

16. The seismic surveying arrangement as claimed in claim 15 wherein the means for acquiring seismic data in the frequency-space domain comprises one or more receivers for acquiring seismic data in the time domain and transform means for transforming the data to the frequency-space domain.

17. A computer-readable medium having stored thereon computer-executable instructions which, when executed by a computer, cause the computer to:
   determine a prediction filter from the seismic data at a first frequency at which swell noise is not present, the seismic data being in the frequency-space domain; and
   apply the prediction filter to seismic data at a second frequency at which swell noise is present, thereby to attenuate swell noise in the seismic data at the second frequency, wherein the second frequency is different from the first frequency.

* * * * *